3,340,210
PROCESS FOR MODIFYING POLYAMIDES WITH AN ALKYLATING AGENT AND A NITROGEN BASE IN AN AQUEOUS MEDIUM
Hans Heinrich Bosshard, Binningen, and Albert Eschenmoser, Zollikon, Switzerland, assignors to Ciba Limited, Basel, Switzerland, a company of Switzerland
No Drawing. Filed Feb. 16, 1965, Ser. No. 433,214
Claims priority, application Switzerland, Feb. 20, 1964, 2,015/64
7 Claims. (Cl. 260—9)

Patent application Ser. No. 345,082, filed Feb. 17, 1964, by A. Eschenmoser et al., provides a process for modifying polyamides, wherein they are reacted with strongly reactive alkylating agents and the resulting polyimino ester salts are reacted with nitrogen bases that contain at least one HN= group. It has now been found that the reaction with water-resistant strongly reactive alkylating agents can be carried out in an aqueous medium, the subsequent reaction with the nitrogen base being likewise performed in an aqueous medium.

For the said reactions there may be used any desired polyamides, for example those from ε-caprolactam, from hexamethylene adipate or from the lactam of amino undecylic acid. They may be used in various forms, for example as powders, chips or foils. Particularly valuable results are as a rule obtained with polyamide fibers.

The term water-resistant strongly reactive alkylating agents as used in this context refers to those a substantial portion of which are capable of reacting with the polyamide even in the presence of water so that they are not extensively decomposed by the water. There are suitable, for example, alkyl sulfates containing lower alkyl radicals such as diethyl sulfate or dimethyl sulfate. Preferred use is made of the trialkyl oxonium salts, especially those containing lower alkyl groups, because of their good reactivity. As relevant examples there may be mentioned the oxonium salts which contain, on the one hand, the cation of the formula (1) 

(where $R_1$ to $R_3$ are identical or different and each represents an alkyl group, such as methyl or ethyl) and, on the other hand, an anion from an atom of a polyvalent metal and the number of halogen atoms greater by 1 greater than the valence of the metal, such as $SbCl_6^-$, $BF_4^-$ and $AlCl_4^-$ and especially $FeCl_4^-$. As is known, these oxonium salts can be prepared from epihalohydrins and metal halide-ether complexes. The proportions in which the two reactants are to be used for the reaction of the polyamide with the trialkyl oxonium salt may vary within wide limits, but in general it is advantageous to proceed so that reaction with the oxonium compound takes place only on some of the carboxylic acid amide groups of the polyamide. Particularly good results are obtained, for example, by impregnating the fibrous material on a padder with an aqueous solution of, for example, about 5 to 30% strength of the oxonium compound and then subjecting it, with or without intermediate drying at room temperature or at a slightly higher temperature, to a dry heat treatment advantageously within the range from 100 to 150° C., the drying time ranging from ½ to 5 minutes. It will be readily realized that the number of groups entering the reaction is increased when the concentration is increased, the temperature is raised or the treatment time is lengthened.

The reaction of the polyamide with the oxonium compound may be represented by the following scheme:

(2) 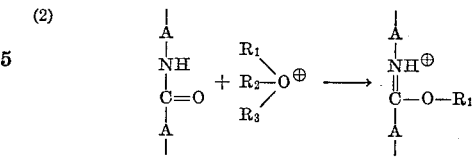

where A stands for an alkylene radical, and $R_1$, $R_2$ and $R_3$ each represents an alkyl radical. Consequently, the reaction products of the polyamides with the trialkyl oxonium salts may be looked upon as polyimino ester salts that contain in addition to structural elements of the formula (3) 

also structural elements of the formula (4) 

where A represents an alkylene group and $R_1$ a preferably lower alkyl radical.

The said polyimino ester salts are reacted according to this invention with nitrogen bases that contain at least one basic HN= group and may belong to a very wide variety of bases of this type, for example inorganic bases such as ammonia, hydroxylamine or hydrazine. As suitable organic bases there may be mentioned:

Monoamines, diamines and polyamines containing at least one primary or secondary amino group, such as monoalkylamines, dialkylamines, alkylenediamines especially ethylenediamine, polyalkylene-polyamines such as diethylenetriamine or triethylenetetraamine, Mono-, di- or trialkylhydrazines such as N,N-dimethylhydrazine, Hydroxyamines such as mono- or diethanolamine, Aminocarboxylic acids such as aminoacetic acid (glycocol), Aminosulfonic acids such as taurine or methyltaurine or 1-amino-benzene-3- or -4-sulfonic acid.

In a special variant of the present process the polyimino salts are reacted with dyestuffs that contain at least one basic HN= group. This gives rise to colored polyamides, with the dyestuffs bound by a covalent bond to the polyamides. Apart from the requirement that the dyestuffs must contain the group mentioned, they may belong to a very wide variety of types. Aminoazo dyes and aminoanthraquinones are particularly suitable. The dyestuffs may but need not contain acid groups imparting solubility in water such as carboxylic acid groups or sulfonic acid groups.

The reaction of the polyimino ester salt with the nitrogen base is carried out in water, advantageously at room temperature or at a moderately elevated temperature ranging, for example, from 20 to 50° C. The reaction may be conducted, for example, for one minute to one hour. It is of advantage to wash out the unreacted reagent, especially when a dyestuff containing amino groups has been used for the reaction.

The reaction of the polyimino ester salts with the primary nitrogen bases can be represented thus:

(5) 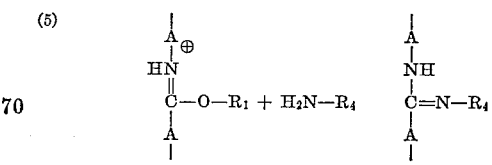

where A represents an alkylene radical and $R_4$ a hydrogen atom or a preferably organic radical.

The products obtained in this manner may be looked upon as polyamidines that contain in addition to structural elements of the formula (6) 

also structural elements of the formula (7) 

where A represents an alkylene group and $R_4$ a hydrogen atom or a preferably organic radical.

By the treatment according to the present invention the properties of the polyamides can be modified in various respects, the possibilities available depending on the type of nitrogen compound selected and on the degree of conversion. Inter alia, it is possible to vary the mechanical properties and/or the water absorption capacity or the wetting property of the material under treatment. Thus, for example, the polyimino ester salts may be reacted with amines containing higher alkyl groups such as dodecyl or octadecyl groups, whereby the fabric is rendered water-repellant. The opposite effect, which may be called hydrophilizing, can be achieved by reaction with amines that contain a plurality of hydroxyl groups or polyglycol residues. By reaction with amines that contain acid groups imparting solubility in water, such as carboxyl or sulfonic acid groups, or with amines that contain in addition to the reactive amino group at least one quaternary ammonium group, it is possible, to produce an antistatic finish on the fabric.

Furthermore, the fixing property for various improving agents such as optical brighteners or ultraviolet filters can be improved. Above all, the suitability for dyeing the polyamides with acid wool dyes, which is insufficient with a large number of these dyes, can be very substantially improved by treatment with basic nitrogen compounds, especially diamines and polyamines according to the present process. Inter alia, the polyamide fibers can be modified in such a manner that they can be dyed strong, fast shades even with those acid wool dyes which are practically unsuitable for dyeing this material in the usual way, without using any special measures, such for example as heating to a temperature above 100° C. Dyeing may also be performed with reactive dyestuffs, especially those which contain chlorotriazine or chloropyrimidine radicals. For dyeing with such reactive dyestuffs there are not only suitable materials reacted with polyamines but also those which have been reacted with hydroxyamines, preferably with polyhydroxyamines so that they are present in the form of polyhydroxylated materials. In the case of polyimino ester salts treated with aminocarboxylic or aminosulfonic acids the affinity towards basic dyestuffs is increased. Furthermore, it is possible to form metal complexes of the modified fibers with the dyestuffs.

Since the afore-mentioned improvements of the polyamide fibers are contingent upon the introduction of certain organic radicals, and these radicals are bound by a covalent bond with the polyamide, a permanent effect is achieved which is very durable towards the stresses usually associated with the wear and the cleaning of the fibrous material.

Example 1

A polyamide staple fiber fabric is padded at 20° C. with a solution of 20 parts of triethyloxonium tetrachloroferriate in 100 parts of water, dried at room temperature, then heated for 1 minute at 120° C. in a thermosetting apparatus, given a short rinse in cold water and the fabric is then treated for 15 minutes with a solution of 20 parts of glucamine in 100 parts of water at 20 to 25° C. The fabric is soaped, rinsed for a short time at about 60° C. and then dyed with the chlorotriazine dyestuff of the formula

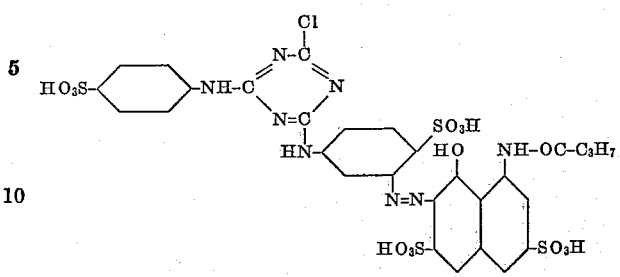

by the exhaustion method in the manner conventionally used in cotton dyeing (alkaline dyebath). The strong red shade obtained after rinsing and soaping possesses good properties of wet fastness.

Example 2

A polyamide staple fiber fabric is padded with a solution of 20 parts of triethyloxonium tetrachloroferriate in 100 parts of water and, without intermediate drying, subjected for 1 minute to a dry heat treatment at 120° C. The fabric is rinsed and then padded with a solution of 20 parts of polyethyleneimine in 100 parts of water, subjected to a dry heat treatment at 100° C. for 5 minutes, rinsed and soaped. The fabric treated in this manner is then dyed with the dyestuff of the formula

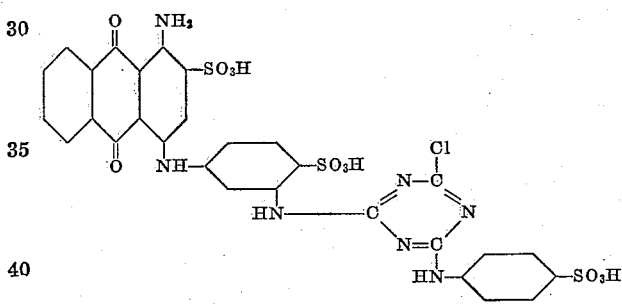

by the exhaustion method in the manner conventionally used for dyeing polyamides (acid dyebath). After rinsing and soaping a deep blue shade is obtained which is fast to washing.

Example 3

A polyamide staple fiber fabric is impregnated with a solution of 20 parts of triethyloxonium tetrachloroferriate in 100 parts of water and, without intermediate drying, subjected to a dry heat treatment at 100° C. for minutes. The fabric is given a short rinse in cold water and then treated for 15 minutes at 100° C. with a solution of 20 parts of glucamine and 2 parts of sodium ethylenediamine tetraacetate in 100 parts of water. After rinsing and soaping the fabric displays distinct hydrophilic properties.

What is claimed is:

1. The process for modifying a shaped polyamide having recurring groups of the formula

wherein A represents an alkylene group, said process comprising: impregnating said polyamide with a 5–30% aqueous solution of a strongly reactive, water-resistant alkylating agent selected from the group consisting of lower alkyl sulfates and trialkyl oxonium salts, heating said polyamide, thereby converting a portion of the amide groups of said polyamide to imino ester salts; and thereafter impregnating said polyamide at a temperature between approximately 20 and 100° C. with a nitrogen base having at least one group of the formula HN<, whereby said imino ester salt groups are converted to amidine groups.

2. The process according to claim 1 wherein the alkylating agent is triethyloxonium tetrachloroferriate.

3. The process for modifying a shaped polyamide having recurring groups of the formula

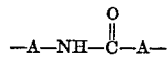

wherein A represents an alkylene group, said process comprising: impregnating said polyamide with a 5–30% aqueous solution of triethyloxonium tetrachloroferriate; heat treating said polyamide thereby converting at least a portion of the amide groups of said polyamide to palyimino ester salts; and thereafter impregnating said polyamide at a temperature between approximately 20 and 100° C. with a nitrogen base having at least one group of the formula HN<, whereby said imino ester salt groups of said polyamide are converted to amidine groups.

4. The process according to claim 3 wherein the heat treating is conducted at temperatures of 100–150° C. for ½ to five minutes.

5. The process according to claim 3 wherein said nitrogen base is glucamine.

6. The process according to claim 3 wherein said nitrogen base is polyethyleneimine.

7. The process according to claim 3 wherein said nitrogen base is a mixture of glucamine and sodium ethylenediamine tetra-acetate.

References Cited

UNITED STATES PATENTS

| 2,855,267 | 10/1958 | Zimmerman | 260—78 |
| 2,989,364 | 6/1961 | Goldann | 260—78 |
| 3,215,654 | 11/1965 | Schmalz | 260—9 |

WILLIAM H. SHORT, *Primary Examiner.*

SAMUEL H. BLECH, *Examiner.*

E. M. WOODBERRY, *Assistant Examiner.*